US006384003B1

(12) United States Patent
Julemont

(10) Patent No.: US 6,384,003 B1
(45) Date of Patent: May 7, 2002

(54) FLOOR CLEANING WIPE COMPRISING PRESERVATIVE

(75) Inventor: Jean Julemont, Verviers (BE)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/992,997

(22) Filed: Nov. 14, 2001

(51) Int. Cl.[7] .......................... C09K 3/22; C11D 17/00

(52) U.S. Cl. ...................... 510/214; 510/215; 510/217; 510/425; 510/428; 510/480; 510/506; 510/508; 424/195; 134/64 R

(58) Field of Search ................................ 510/214, 215, 510/217, 425, 438, 480, 506, 508; 424/195; 134/64 R

(56) References Cited

U.S. PATENT DOCUMENTS

| | | | | | |
|---|---|---|---|---|---|
| 6,086,903 | A | * | 7/2000 | Trinh et al. | 424/401 |
| 6,242,401 | B1 | * | 6/2001 | Durbut et al. | 510/235 |

* cited by examiner

*Primary Examiner*—Necholus Ogden
(74) *Attorney, Agent, or Firm*—Richard E. Nanfeldt

(57) ABSTRACT

A floor cleaning wipe comprising a water insoluble substrate which is impregnated with a floor cleaning composition.

5 Claims, No Drawings

FLOOR CLEANING WIPE COMPRISING PRESERVATIVE

FIELD OF THE INVENTION

The present invention relates to a floor cleaning wipe which comprises a water insoluble substrate which has been impregnated with a liquid floor cleaning composition.

BACKGROUND OF THE INVENTION

The patent literature describes numerous wipes for both body cleaning and cleaning of hard surfaces but none describe the instant cleaning wipes which have improved cleaning characteristics in the minimization of streaking and residue, together with optimum mileage.

U.S. Pat. Nos. 5,756,612; 5,763,332; 5,908,707; 5,914,177; 5,980,922 and 6,168,852 teach cleaning compositions which are inverse emulsions.

U.S. Pat. Nos. 6,183,315 and 6,183,763 teach cleaning compositions containing a proton donating agent and having an acidic pH.

U.S. Pat. Nos. 5,863,663; 5,952,043; 6,063,746 and 6,121,165 teaches cleaning compositions which are emulsions.

SUMMARY OF THE INVENTION

A floor cleaning wipe for cleaning floors comprises a water insoluble substrate which is impregnated with a liquid cleaning composition containing an anionic surfactant, at least one nonionic surfactant, a short chain amphiphile, an inorganic magnesium salt, and water, wherein the liquid cleaning composition is not an emulsion and does not contain a zwitterionic surfactant, proteins, metallic salts, enzymes, amides, sodium hypochlorite, dimethicone, N-methyl-2-pyrrolidone, monoalkyl phosphate or silicon based sulfosuccinate.

DETAILED DESCRIPTION OF THE INVENTION

The present invention relates to a floor cleaning wipe for hard surfaces which comprises approximately:

(a) 10 wt. % to 30 wt. % of a water insoluble substrate; and (b) 70 wt. % to 90 wt. % of a liquid floor cleaning composition being impregnated in said water insoluble substrate, wherein said liquid cleaning composition comprises:

(i) 0.01 wt. % to 2 wt. %, more preferably 0.02 wt. % to 1.5 wt. % of an anionic surfactant;

(ii) 0.01% to 0.5% of an inorganic magnesium salt;

(iii) 0.01% to 0.5% of a short chain amphiphile;

(iv) 0.005 wt. % to 1 wt. % of preservative ingredients such as 1,3-dimethylol-5,5-dimethylhydantoin, 5-bromo-5-nitro-dioxane, iodopropynyl butyl carbamate and mixture thereof;

(v) 0.05% to 0.5% of a chelating agent such as sodium ethylenediamine-N,N-tetraacetate or sodium ethylenediamine-N,N-disuccinate (vi) 0.01 to 0.5 wt. % of a perfume;

(vii) 0.05 wt. % to 4 wt. %, more preferably 0.75 wt. % to 3.0 wt. % of at least one ethoxylated nonionic surfactant; and (viii) the balance being water, wherein the composition has a pH of about 5.5 to about 7, more preferably about 5.8 to about 7.0.

The anionic sulfonate surfactants which may be used in the cleaning compositions of this invention are water soluble and include the sodium, potassium, ammonium and ethanolammonium salts of linear $C_8$–$C_{16}$ alkyl benzene sulfonates; $C_{10}$–$C_{20}$ paraffin sulfonates, alpha olefin sulfonates containing about 10–24 carbon atoms and $C_8$–$C_{18}$ ethoxylated alkyl ether sulfates and mixtures thereof. The preferred anionic sulfonate surfactant is a $C_{12-18}$ paraffin sulfonate.

The paraffin sulfonates may be monosulfonates or di-sulfonates and usually are mixtures thereof, obtained by sulfonating paraffins of 10 to 20 carbon atoms. Preferred paraffin sulfonates are those of $C_{12-18}$ carbon atoms chains, and more preferably they are of $C_{14-17}$ chains. Paraffin sulfonates that have the sulfonate group(s) distributed along the paraffin chain are described in U.S. Pat. Nos. 2,503,280; 2,507,088; 3,260,744; and 3,372,188; and also in German Patent 735,096. Such compounds may be made to specifications and desirably the content of paraffin sulfonates outside the $C_{14-17}$ range will be minor and will be minimized, as will be any contents of di- or poly-sulfonates.

Examples of suitable other sulfonated anionic detergents are the well known higher alkyl mononuclear aromatic sulfonates, such as the higher alkylbenzene sulfonates containing 9 to 18 or preferably 9 to 16 carbon atoms in the higher alkyl group in a straight or branched chain, or $C_{8-15}$ alkyl toluene sulfonates. A preferred alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Preferred materials are set forth in U.S. Pat. No. 3,320,174, especially those in which the alkyls are of 10 to 13 carbon atoms.

The $C_{8-18}$ ethoxylated alkyl ether sulfate surfactants have the structure $$R-(OCHCH_2)_nOSO_3^-M^+$$

wherein n is about 1 to about 22 more preferably 1 to 3 and R is an alkyl group having about 8 to about 18 carbon atoms, more preferably 12 to 15 and natural cuts, for example, $C_{12-14}$ or $C_{12-16}$ and M is an ammonium cation or a metal cation, most preferably sodium.

The ethoxylated alkyl ether sulfate may be made by sulfating the condensation product of ethylene oxide and $C_{8-10}$ alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc. The instant compositions show a marked improvement in ecotoxocity as compared to existing commercial products.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15 carbon atoms, such as $C_9$–$C_{11}$ alkanol condensed with 2.5 to 10 moles of ethylene oxide (NEODOL 91-2.5 or -5 or -6 or -8), $C_{12-13}$ alkanol condensed with 6.5 moles ethylene oxide (Neodol 23-6.5), $C_{12-15}$ alkanol condensed with 12 moles ethylene oxide (Neodol 25-12), $C_{14-15}$ alkanol condensed with 13 moles ethylene oxide (Neodol 45-13), and the like.

An especially preferred nonionic system comprises the mixture of a nonionic surfactant formed from a $C_9$–$C_{11}$ alkanol condensed with 2 to 3.5 moles of ethylene oxide ($C_{9-11}$ alcohol EO 2 to 3.5:1) with a nonionic surfactant formed from a $C_9$–$C_{11}$ alkanol condensed with 7 to 9 moles of ethylene oxide ($C_9$–$C_{11}$ alcohol EO 7 to 9:1), wherein the weight ratio of the $C_9$–$C_{11}$ alcohol EO 7 to 9:1 to the $C_9$–$C_{11}$ alcohol EO 2 to 3.5:1 is from 8:1 to 1:1 from preferably 6:1 to 3:1.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic detergents include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl phenol condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Also among the satisfactory nonionic detergents are the water-soluble condensation products of a $C_8$–$C_{20}$ alkanol with a heteric mixture of ethylene oxide and propylene oxide wherein the weight ratio of ethylene oxide to propylene oxide is from 2.5:1 to 4:1, preferably 2.8:1 to 3.3:1, with the total of the ethylene oxide and propylene oxide (including the terminal ethanol or propanol group) being from 60–85%, preferably 70–80%, by weight. Such detergents are commercially available from BASF-Wyandotte and a particularly preferred detergent is a $C_{10}$–$C_{16}$ alkanol condensate with ethylene oxide and propylene oxide, the weight ratio of ethylene oxide to propylene oxide being 3:1 and the total alkoxy content being about 75% by weight.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described composition. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Other suitable water-soluble nonionic detergents are marketed under the trade name "Pluronics". The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L 62 and L 64.

One of the short chain amphiphile which is used in the instant floor cleaning composition is not a surfactant and is characterized by the formula:

$$R_1O\ (CH_2CH_2O)_nH$$

wherein $R_1$ is a straight or branched chain alkyl group having 2 to 6 carbon atoms and n is a number from 2 to 8, more preferably 3 to 6 and the amphiphile has an HLB of about 6 to about 9, preferably about 7 to about 8. Preferred amphiphiles have a $C_6$ alkyl group and 2 to 5 EO such as hexanol 5EO.

Another short chain amphiphile which can be used in the instant floor cleaning composition is not a surfactant and is characterized by the formula:

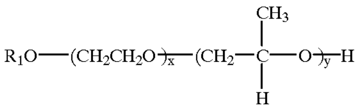

or

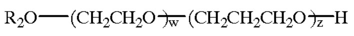

wherein $R_1$ or $R_2$ are a straight or branched chain alkyl group having 2 to 6 carbon atoms and x or w is a number from 2 to 5, more preferably 2 to 4 and y or z is a number from 1 to 4, more preferably 1 to 3 and the amphiphile has an HLB of about 6 to about 9, preferably about 7 to about 8. Preferred amphiphiles have a $C_6$ alkyl group and 2 to 5 EO such as hexanol 5EO such as Emulan™ HE50).

The final essential ingredient in the instant composition is water. The proportion of water in the compositions generally is in the range of 70 wt. % to 99.0 wt. %.

The floor cleaning composition of this invention may, if desired, also contain other components either to provide additional effect or to make the product more attractive to the consumer. The following are mentioned by way of example: Colors or dyes in amounts up to 0.5% by weight; chelating agents such as ethylene diamine tretraacetic acid, ethylene diamine N,N disuccinic acid, methylglycine N,N diacetic acid, glutamic N,N diacetic acid, phosphonic acid and salt thereof; preservatives, such as formalin, 5-bromo-5-nitro-dioxane, 2-bromo-2-nitropropane-1,3-diol, methylisothiazolone, 5-chloro-2-methyl4-isothaliazolin-3-one, 1,3dimethylol-5,5-dimethylhydantoin, iodopropynyl butylcarbamate and mixture thereof; antioxidizing agent such as 2,6-di-tert.butyl-p-cresol and tetradibutyl pentaerithrityl hydroxyhydrocinnamate; UV-light absorber, etc., in amounts up to 2% by weight; and pH adjusting agents, such as sulfuric acid or sodium hydroxide, as needed.

The cleaning compositions are prepared by simple batch mixing at 25° C.–30° C. The nonwoven fabric is impregnated with the liquid cleaning composition by means of a positive impregnation process. The liquid is positively fed into the water insoluble substrate through a controlled gear pump and injection bar at a ratio of about 5 grams of liquid cleaning composition to about 1 gram of the nonwoven fabric.

The water insoluble substrate is a nonwoven fabric which is formed from 10 wt. % to 90 wt. % of viscose fibers and 10 wt. % to 90 wt. % of polyester fibers such as Spunlaces made by the Dexter Corporation or Jacob Holm. The nonwoven fabric, due to its weight and composition, has high absorption capacity, and in addition allows smooth release of water to the floor and consequently ensures the highest possible mileage. A preferred substrate is a 100 g/sqm spunlace non woven made by Jacob Holm whose composition is about 65% of viscose fiber and about 35% of polyester fiber.

The following examples illustrate liquid cleaning compositions of the described invention. The exemplified compositions are illustrative only and do not limit the scope of the invention. Unless otherwise specified, the proportions in the examples and elsewhere in the specification are by weight.

EXAMPLE 1

The following floor cleaning wipes were made by the aforementioned process

| Part 1 | A Wt. % |
|---|---|
| Hexanol EO5:1 | 0.036 |
| Plurafac LF300 | 0.036 |
| Paraffin sulfonate | 0.09 |
| C9-C11 alcohol EO7.5-8:1 nonionic | 0.072 |
| Perfume | 0.04 |
| Iodopropynyl butyl carbamate | 0.027 |
| MgSO4.7H2O | 0.03 |
| Water | Bal. |
| Part II | |
| Part I | 83.33 |
| Spunlace 100 g/sqm ex Jacob Holm | 16.67 |

Other competitive products of impregnated floor cleaner were tested comparatively to product A. There are respectively:

Product B: Sofix floor wipes ex Henkel

Product C: Spontex floor wipes ex Spontex

Product D: St Marc floor wipes ex Reckitt Benckiser

All formulas were compared for two different tests: residue on Perspex tiles as well as mileage on vinly type floor

1. RESIDUE TEST 15 cm×15 cm Perspex black tiles are wiped with the impregnated test substrate in a circular movement such that the middle of the tile is wet and contours kept dry.

Each test product is applied on 5 different tiles (=5 replicates), then 5 judges score the residue pattern (observation made under indirect light conditions) of each tile from 0=very poor residue score up to 10=excellent, no residue on a 10 point scale. Results are then analyzed statistically.

Formulas A to D were tested for residue on Perspex tiles and rated on a 10 point scale (0=very poor/much residue and 10=very good/no residue).

| | A | B | C | D |
|---|---|---|---|---|
| Residue score | 6.5 | 1.4 | 2.6 | 2.5 |

2. MILEAGE: each impregnated wipe is fit to an adapted implement. The mileage is the number of square meters of a vinyl type floor that are possible to clean (=wet) until one can notice that liquid is exhausted from the wipe, which results into no wetting of the floor Results observed are as follows:

| | A | B | C | D |
|---|---|---|---|---|
| Mileage (sqm) | 7.0 | 4.5 | 4.0 | 4.0 |

What is claimed:

1. A floor cleaning wipe which comprises approximately:

(a) 10 wt. % to 30 wt. % of a water insoluble substrate; and (b) 70 wt. % to 90 wt. % of a liquid floor cleaning composition being impregnated in said water insoluble substrate, wherein said liquid cleaning composition comprises:

(i) 0.01 wt. % to 2.0 wt. % of an anionic surfactant;

(ii) 0.01 wt. % to 0.5 wt. % of an inorganic magnesium salt such as magnesium oxide, magnesium chloride and magnesium sulfate heptahydrate;

(iii) 0.01 wt. % to 0.5 wt. % of a short chain amphiphile;

(iv) 0.01 wt. % to 0.5 wt. % of a perfume;

(v) 0.05 wt. % to 4 wt. % of at least one ethoxylated nonionic surfactant (vi) 0.005 wt. % to 0.1 wt. % of a preservative ingredient selected from the group consisting of idopropynyl butyl carbamate, 1,3-dimethylol-5,5-dimethylhydantoin, 5-bromo-5-nitro-dioxane, and mixtures thereof; and (vii) the balance being water.

2. The floor cleaning wipe of claim 1, wherein said anionic surfactant is a paraffin sulfonate.

3. The floor cleaning wipe of claim 2, wherein said amphiphile is characterized by the formula:

$$R_1O(CH_2CH_2O)_nH$$

wherein $R_1$ is a $C_2$–$C_6$ alkyl group and n is a number from 2 to 8.

4. The floor cleaning wipe according to claim 1, wherein said short chain amphiphile is characterized by the formula:

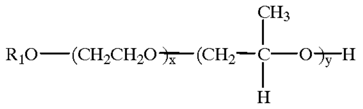

or $$R_2O—(CH_2CH_2O)_w(CH_2CH_2CH_2O)_z—H$$

wherein $R_1$ or $R_2$ are a $C_2$–$C_6$ alkyl group, x or w is a number from 2 to 5 and y or z is a number from 1 to 4.

5. The floor cleaning wipe of claim 1, further including a chelating agent such as sodium ethylenediamine-N,N-tetraacetate or sodium ethylenediamine-N,N-disuccinate.

* * * * *